(12) United States Patent
Brunetti et al.

(10) Patent No.: US 7,850,531 B2
(45) Date of Patent: Dec. 14, 2010

(54) AXIAL COUPLING OF A CONSTANT VELOCITY JOINT TO A HUB BEARING UNIT OF A MOTOR VEHICLE WHEEL

(75) Inventors: Marco Brunetti, Turin (IT); Cristian Concu, Turin (IT)

(73) Assignee: Aktiebolaget SKF, Gothenburg (SE)

( * ) Notice: Subject to any disclaimer, the term of this patent is extended or adjusted under 35 U.S.C. 154(b) by 449 days.

(21) Appl. No.: 11/954,358

(22) Filed: Dec. 12, 2007

(65) Prior Publication Data

US 2008/0182674 A1 Jul. 31, 2008

(30) Foreign Application Priority Data

Jan. 29, 2007 (EP) .................................. 07101347

(51) Int. Cl.
*F16D 3/84* (2006.01)
(52) U.S. Cl. ...................................... 464/178; 464/182
(58) Field of Classification Search ................. 464/178, 464/182; 384/544, 589; 403/359.5
See application file for complete search history.

(56) References Cited

U.S. PATENT DOCUMENTS

| 4,440,256 A | * | 4/1984 | Palmer ........................ 180/254 |
| 5,674,011 A | | 10/1997 | Hofmann et al. |
| 6,354,952 B1 | | 3/2002 | Boulton et al. |

* cited by examiner

*Primary Examiner*—Aaron Dunwoody
(74) *Attorney, Agent, or Firm*—Merchant & Gould P.C.

(57) ABSTRACT

A constant velocity joint has an outer bell telescopically coupled for rotation with a rotatable hub of a hub bearing unit so as to provide torque transmission thereto. The joint bell is releasably axially coupled to a rotatable member of the hub bearing unit by an annular connector. The connector includes a radially inwardly extending annular flange axially clamped against a rigid annular part fixed to or integral with the hub, and a radially outer portion extending axially around a cylindrical surface of the joint bell. This outer portion has a resiliently radially expansible section with one or more radially inwardly extending protrusions providing a snap connection with a relief or recess formed on the cylindrical outer surface of the joint.

10 Claims, 2 Drawing Sheets

AXIAL COUPLING OF A CONSTANT VELOCITY JOINT TO A HUB BEARING UNIT OF A MOTOR VEHICLE WHEEL

BACKGROUND OF THE INVENTION

The present invention refers to the axial coupling of a constant velocity joint to a hub bearing unit of a motor vehicle wheel.

SUMMARY OF THE INVENTION

Arrangements are known from patent publications US 2002/0070506 A1 and U.S. Pat. No. 6,354,952 B1 wherein the hub of the wheel receives the driving torque from the bell of the constant velocity joint through a splined coupling. To this end, fixed on the hub is a ring with an axial outer toothing that is inserted in a tubular projection with an inner axial toothing of the outer part or "bell" of the constant velocity joint. The toothed ring and the tubular projection are both provided with a respective circular groove in which an elastic, open locking ring is fitted. This elastic ring has arms at its ends that project through a slot formed at the axially outer end (or outboard end) of the joint bell. Illustrated in FIG. 5 of US 2002/0070506 A1 is a sealing elastic sleeve which, at one end, is positioned on an outer cylindrical surface of the tubular projection of the joint bell, covering from the outside the said slot and the end arms of the locking ring, and at the other end sealingly cooperates with an annular part fixed to the end to the hub, particularly with an insert of a sealing device of the bearing.

A scarcely efficient sealing allows water to penetrate, especially through the slot formed at the end of the joint bell, into the splined interface zone. Rust formed at the interface of the splined coupling renders the disassembling operation of the hub-bearing unit from the constant velocity joint particularly difficult, besides shortening the life of these members.

U.S. Pat. No. 5,674,011 discloses an annular connector of elastic material for axially connecting the bell of a constant velocity joint to a hub bearing unit. The connector has two projections that snap into respective grooves formed in a bearing race and in the joint bell, and a third elastic projection extending between the hub and the joint bell so as to dampen vibration.

The object of the invention is provide an improved axial coupling between the constant velocity joint and the hub bearing unit, facilitating assembling and disassembling of these two units and simultaneously solving the above discussed problem concerning sealing. Another object of the invention is to simplify the machining of some of the members that transmit the driving torque between the joint and the hub bearing unit.

BRIEF DESCRIPTION OF THE DRAWINGS

Two preferred, but not limiting embodiments of the invention will now be described, reference being made to the accompanying drawings, in which.

DETAILED DESCRIPTION OF THE PREFERRED EMBODIMENT(S)

Figure 1:
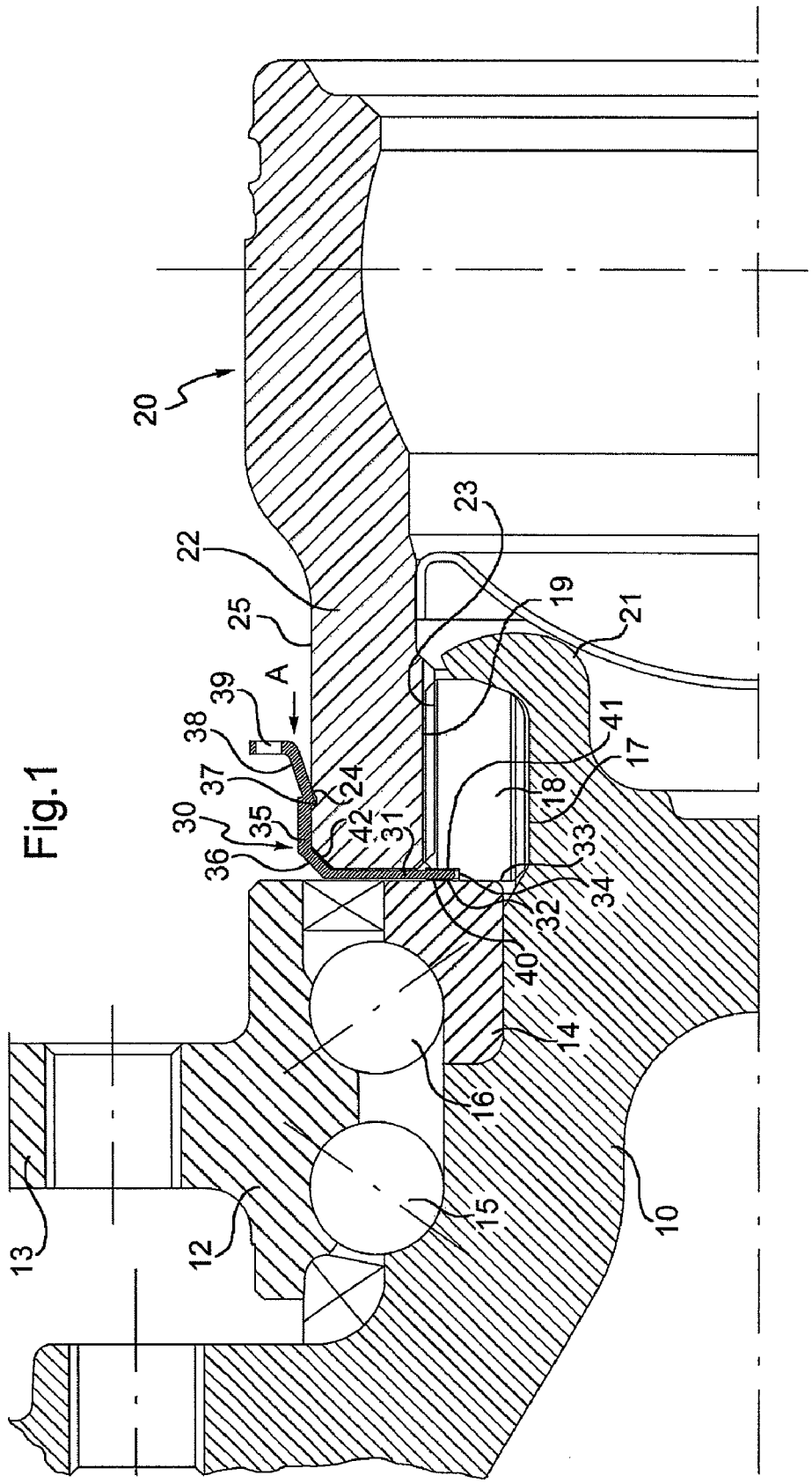
FIG. 1 is an axial cross section view of a first embodiment of a connector device according to the invention, coupling a constant velocity joint to a hub bearing unit.

With reference initially to FIG. 1, a hub 10 for a driving wheel of a motor vehicle is rotatably mounted in the suspension standard (not shown) of the motor vehicle through a bearing unit which includes an outer stationary race 12 having a flange 13 fixed to the standard through bolts (not shown). Locked onto the hub 10 is an inner bearing race 14 that forms the inner raceway for one of the two sets of balls 15, 16 of the bearing unit. The hub has a cylindrical surface 17 towards its axially outer end, onto which there is fixed a driving ring 18 with outer axial splines 19 for transferring the driving torque from the bell 20 of the constant velocity joint to the hub. The driving ring 18 is securely axially locked against the inner bearing race 14 by cold forming, preferably by orbital rolling, of an end edge 21 of the hub.

At its axially outer side, the joint bell 20 forms a tubular projection 22 with inner axial splines 23 which couple with the outer splines 19 of the driving ring 18 in order to transfer the driving torque to the hub.

The driving ring 18 and the joint bell 20 are axially removably coupled by an annular connector 30. The connector 30, preferably made of sheet steel, has a flange 31 extending in a radially inner direction and a radially outer portion axially extending around the cylindrical outer surface 25 of the joint bell 20 and connected in snap manner thereto.

The inner flange 31 has a radially innermost peripheral part 32 axially sealingly clamped between the inner bearing race 14 and the driving ring 18. The two opposite sides of the innermost peripheral part 32 are covered with respective layers 40, 41 of elastomeric material which remain axially interposed, on one side, between the inner race 14 and the flange 31 and, on the opposite side, between the driving ring 18 and the same flange 31. Preferably, the elastomeric layers 40, 41 are in form of thin annular discs vulcanised on the two opposite sides of the flange 31.

In the example shown in FIG. 1, a peripheral circular recess 34 is formed in the side of the driving ring 18 facing the inner bearing race 14 in order to accommodate the inner peripheral part 32 of the flange 31. The annular connector 30 is preliminarily fitted in the recess 34 of the driving ring 18 before this is slipped onto the cylindrical surface 17 of the hub and subsequently axially locked against the inner bearing race 14 by rolling the edge 21 of the hub. According to a variant (not shown), as an alternative to what is illustrated in FIG. 1, the peripheral recess 34 may be absent, whereby the innermost part 32 of the flange 31 remains clamped between the rings 14 and 18 keeping them slightly axially spaced from one another.

A further annular sealing layer 42 is vulcanised on a conical section 36 that joins the inner flange 31 and the axially extending portion that is described herein after.

The axially extending portion of connector 30 comprises a cylindrical length 35 having at least one radially inwardly extending protrusion 37. The protrusion 37 provides a coupling means that snap engages a circular groove 24 formed on the outer cylindrical surface 25 of the tubular projection 22 of the joint. The coupling seat constituted by the groove 24 may, as an alternative, be a recess of different shape or a relief.

The axially extending portion preferably includes a conical end section 38 diverging in an axially inner direction. This favours the insertion and snap-locking of the bell joint to the hub bearing unit and favours also the access for an unlocking tool (not shown) that is pushed in the direction of arrow A for widening the annular connector 30 so as to release the protrusion 37 from the groove 24 and therefore detach the hub bearing unit from the constant velocity joint.

The protrusion 37 may consist of a circular rib or a number of circumferentially aligned teeth. The cylindrical and conical sections 35, 38 may be circumferentially continuous or discrete. In this latter case they will consist, partly or totally, of a plurality of circumferentially spaced cantilevered arms defining, as a whole, a circumferentially discrete surface for facilitating radial expansion and disengagement of the protrusions 37 from the groove 24.

The end section 38 may advantageously form a number of circumferentially equally spaced radial apertures 39 that serve as a phonic wheel or encoder for a sensor (not shown) carried by the suspension standard and facing the apertures 39 in order to detect rotation of the hub.

It will be observed that the sealing layers 40, 41, 42 hermetically seal the interface between the constant velocity joint and the hub bearing unit, preventing water and other contaminants from entering. It will be appreciated that no slot is to be machined in the tubular projection 22 for allowing access to the end arms of a conventional open elastic locking ring of the kind discussed in the introductory part of the description. Furthermore, it is no longer necessary to machine the conventional circular grooves that cross the facing axial splines of the joint bell and the driving ring.

Figure 2:
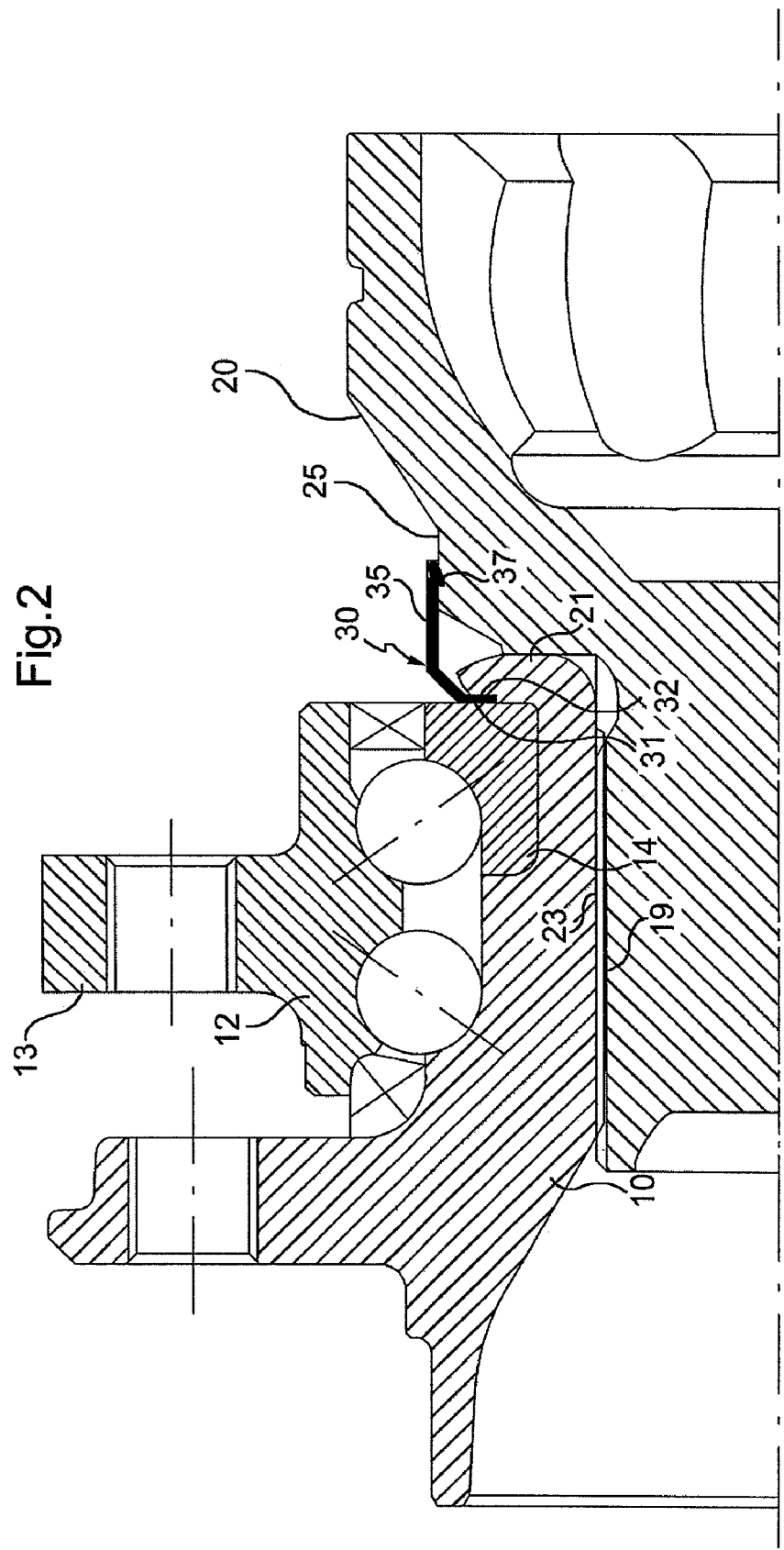
FIG. 2 is a view, similar to that of FIG. 1, of a second embodiment of the invention.

In the alternative embodiment shown in FIG. 2, the driving torque from the joint bell 20 to the hub 10 is transmitted by means of a more conventional splined coupling 19, 23 through a central cavity of the hub, i.e. without a driving ring of the kind indicated at 18 in FIG. 1. The present invention is equally applicable also to a coupling of the kind shown in FIG. 2. As shown, the connector 30 has a radially inner flange 31, the radially innermost part of which 32 remains sealingly clamped and axially securely locked between the inner bearing race 14 and the end edge 21 of the hub which is cold formed, preferably by orbital rolling, against the inner race 14. Indicated at 37 are coupling teeth or a coupling rib similar to that of FIG. 1.

What is claimed is:

1. A coupling arrangement between a hub bearing unit for a motor vehicle wheel and an associated constant velocity joint,
    the constant velocity joint having an outer rotatable bell member telescopically coupled for rotation with a rotatable member of the hub bearing unit so as to provide torque transmission to a rotatable hub of the hub bearing unit,
    the bell member having a cylindrical outer surface, and
    an annular connector releasably axially coupling the joint bell to a rotatable member of the hub bearing unit,
    the annular connector comprising:
        a radially inwardly extending annular flange axially clamped against a rigid annular part fixed to or integral with the hub,
        a radially outer portion extending axially around said cylindrical surface of the joint bell, said outer portion having a resiliently radially expansible section with at least one radially inwardly extending protrusion providing a snap connection with a relief or recess formed on the cylindrical outer surface of the joint;
    wherein:
        a driving ring is fixed to the rotatable hub providing torque transmission to the hub from the rotatable bell member of the constant velocity joint;
        the bell member has a tubular projection in telescopic relation with the driving ring, the tubular projection forming said cylindrical outer surface;
        the annular connector releasably axially couples the joint bell to the driving ring; and
        the radially inwardly extending flange is axially clamped between a rigid annular race of the bearing and the driving ring.

2. The coupling arrangement of claim 1, wherein the radially inwardly extending flange is axially clamped between a rigid annular race of the bearing and a radially outwardly cold formed edge of the hub.

3. The coupling arrangement of claim 1, wherein the radially expansible section of the connector includes a conical end section diverging in an axially inner direction.

4. The coupling arrangement of claim 1, wherein two opposite sides of the inwardly extending flange are at least partly covered with a respective annular layer of elastomeric material.

5. The coupling arrangement of claim 1, wherein an annular layer of elastomeric material is attached on the inside of a section that joins the radially inwardly extending flange and the radially outer, axially extending portion of the connector.

6. The coupling arrangement of claim 1, wherein the connector forms a plurality of equally angularly spaced openings for detecting rotation of the hub.

7. The coupling arrangement of claim 1, wherein the driving ring forms a peripheral circular recess for tightly accommodating a radially innermost portion of the inwardly extending flange of the connector between the same driving ring and the bearing race.

8. A hub bearing assembly for a driving wheel of a motor vehicle, the assembly comprising:
    a hub bearing unit including an outer stationary race, an inner rotatable race fixed on a rotatable hub and a splined surface fixed with respect to the hub for receiving torque transmission from a bell member of a constant velocity joint,
    an annular connector for releasably axially coupling the bell member of the constant velocity joint to a rotatable member of hub bearing unit, the annular connector comprising:
        a radially inwardly extending annular flange suitable for being axially clamped against a rigid annular part fixed to or integral with the hub;
        a radially outer portion extending axially around a cylindrical surface of the bell member, said outer portion having a resiliently radially expansible section with at least one radially inwardly extending protrusion for providing a snap connection with a relief or recess formed on a cylindrical outer surface of the joint;
    wherein said radially inwardly extending annular flange of the connector is axially clamped between the inner rotatable bearing race and a splined driving ring fixed to the rotatable hub of the hub bearing unit.

9. The hub bearing assembly of claim 8, wherein the driving ring forms a peripheral circular recess for tightly accommodating a radially innermost portion of the inwardly extending flange of the connector between the same driving ring and the bearing race.

10. The hub bearing assembly of claim 8, wherein the other of the two rigid annular parts is a radially outwardly cold formed edge of the hub.

* * * * *